United States Patent [19]

Piotrowski

[11] Patent Number: 5,077,877
[45] Date of Patent: Jan. 7, 1992

[54] SPLIT RING ASSEMBLY APPARATUS

[75] Inventor: Eugene G. Piotrowski, Stevens Point, Wis.

[73] Assignee: Worth Manufacturing Co., Stevens Point, Wis.

[21] Appl. No.: 607,240

[22] Filed: Oct. 31, 1990

[51] Int. Cl.$^5$ .................. B23P 19/04; B23Q 7/10
[52] U.S. Cl. .................... 29/229; 29/240.5; 29/243.56; 29/717; 29/809
[58] Field of Search .................. 29/225, 226, 227, 228, 29/229, 240, 240.5, 243.56, 428, 717, 809; 901/41, 42

[56] References Cited

U.S. PATENT DOCUMENTS

| | | | |
|---|---|---|---|
| 3,340,595 | 9/1967 | Headley | 29/227 X |
| 3,503,115 | 3/1970 | Kirchner | 29/225 X |
| 3,596,341 | 8/1971 | Herkner | 29/227 X |
| 3,653,185 | 3/1987 | Kajima et al. | 29/225 X |
| 4,715,114 | 12/1987 | Yajima | 29/227 X |
| 4,769,884 | 9/1988 | Datseris et al. | 29/428 X |

*Primary Examiner*—Joseph M. Gorski
*Assistant Examiner*—Peter Dungba Vo
*Attorney, Agent, or Firm*—Andrus, Sceales, Starke & Sawall

[57] ABSTRACT

A split ring assembly apparatus utilizes a unique combination of three major subassemblies whose interaction is microprocessor controlled to facilitate operator attachment of object to a split ring. A ring delivery and pickup arm subassembly automatically delivers rings to an operating position where the combined interaction of the clamping/rotating and splitter wheel subassemblies precisely locate and position the ring gap adjacent the operator, open the split in the ring adjacent the gap to enable initial attachment of objects to the ring by the operator, and complete rotation of the ring with respect to the objects resulting in full attachment. Various position sensors monitor and control operation and interaction of the subassemblies to provide reliable, safe and efficient operation.

12 Claims, 4 Drawing Sheets

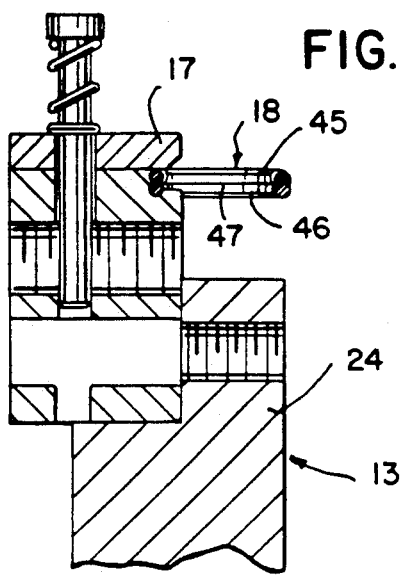
FIG. 5
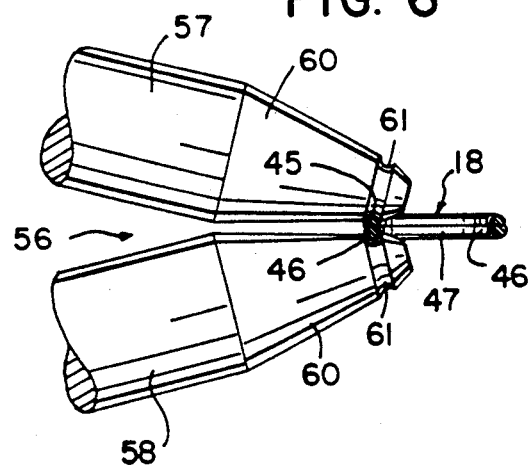
FIG. 6
FIG. 7
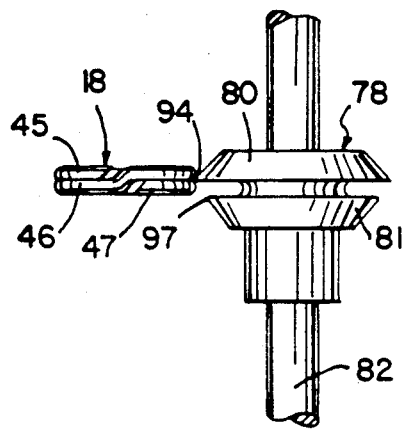
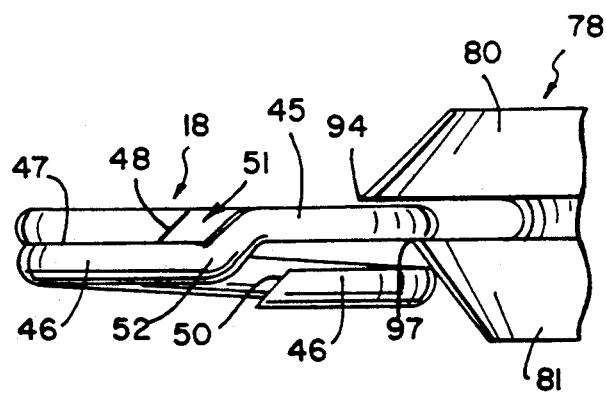
FIG. 8
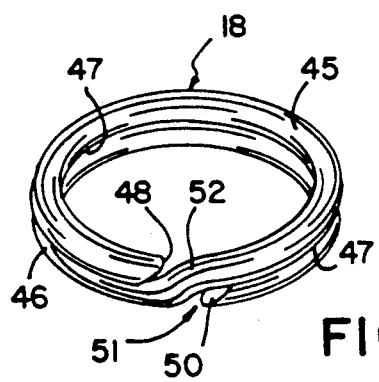
FIG. 9

SPLIT RING ASSEMBLY APPARATUS

BACKGROUND OF THE INVENTION

The present invention relates to equipment for handling split rings and, more particularly, to an apparatus for delivering, positioning, and opening a split ring to facilitate operator attachment of an object thereto.

Split rings are old and well known as a convenient means of attaching a variety of objects in a secure manner. Key rings are but one example of the multitude of uses to which splits rings are adapted. Split rings are also widely used in the assembly of many products, one common example of which is fishing lures and other types of fishing tackle. Split rings are commonly used, for example, to attach a fish hook to the body of a lure.

In the assembly of fishing lures, very small split rings are commonly used. For example, a very small split ring may have an outside diameter of about 0.16 inch (4 millimeters) and a wire diameter of 0.03 inch (0.7 millimeter). In addition, two closed loop objects, namely, the looped end of the hook and a similar loop attached to the lure body, must be attached to the same split ring. The assembly of these and similar objects to small split rings is extremely tedious and time consuming if done manually.

Although split rings come in a large variety of sizes and cross sectional shapes, a split ring is typically characterized by two coils of a single length of wire formed back-to-back in a tight coil with the opposing surfaces flattened somewhat and the opposite free ends spaced by a small gap on opposite sides of the wire at the point of wire crossover from one coil to the other. In any assembly technique, a tool is typically inserted into the split between the coils and adjacent one free end of the wire to allow the closed-loop objects intended to be attached to the ring to be slipped over the free end. Thereafter, the ring is simply rotated or turned with respect to the object approximately one complete turn to allow the object to travel along the split between the two coils until it reaches the opposite free end, whereupon the object completely encircles the ring coil and is secured thereto. Equipment of various types has been developed to facilitate the assembly of objects to split rings. Such equipment has varied in complexity from a simple hand-held pliers device including a pointed tooth on one jaw to facilitate opening the split in the ring, to more complex semiautomatic assembly equipment which actually holds, positions, and opens a ring in a manner to allow an operator to handle only the object or objects to be attached to the ring.

Although such semiautomatic assembly equipment has reduced substantially the tedious and time consuming task of split ring assembly, such equipment has not always operated reliably, particularly in handling the very small diameter split ring. There is, therefore, a need for improved split ring assembly equipment which can accurately and reliably handle a range of split ring sizes in a manner which will present the split rings in sequence and in proper orientation for rapid operator-assisted assembly of the object or objects thereto.

SUMMARY OF THE INVENTION

In accordance with the present invention, a split ring assembly apparatus is operable to pick-up and deliver a split ring, randomly oriented with respect to the ring gap, and deliver it to an operating position where it is sequentially engaged by a two-stage ring splitter to first locate the gap and then open the split and orient an open free end immediately in front of the operator. The ring splitter works in conjunction with two pairs of clamping and rotating fingers which hold the ring firmly in position to be acted on by the ring splitter and which rotate the ring both for initial positioning and for rotation with respect to the object to be attached to the ring. Position or proximity sensors and microprocessor control are utilized to substantially enhance accuracy and reliability.

In accordance with the preferred embodiment, the apparatus includes means for sequentially feeding split rings to a pick-up position where a transfer means grasps a randomly oriented split ring and transfers the ring to an operating position. Ring clamping means in the operating position receives and clamps the ring delivered by the transfer means. A unique splitter means is movable into the operating position and includes a first stage operable to locate and selectively position the ring gap as the ring is being independently rotated by associated ring rotating means integral with the clamping means. The splitter means also includes a second stage adapted to move into the operating position and to engage and open the split adjacent one free end of the ring to facilitate operator placement of the object to be attached over said free end. The rotating means is thereafter operable to rotate the ring approximately one complete revolution along and with respect to the object being assembled until the object is completely attached to the ring.

The ring transfer means preferably comprises a pick-up arm mounted to rotate about one of its ends to thereby move the other end between the ring pick-up position and the operating position. The free end of the pick-up arm includes spring biased jaw means for grasping a split ring and holding it for delivery to the operating position. The pick-up arm, including the jaw means, is also rotatable on its axis in response to its rotation about the end of the arm. Means for simultaneously rotating the pick-up arm about its one end and on its axis is also provided.

The ring feeding means comprises a vibratory feeder which is adapted to deliver split rings which are oriented generally horizontally in the plane of the ring and completely randomly with respect to the circumferential position of the ring gap. A first position sensor means is utilized to sense the pick-up position and the operating position of the pick-up arm and to generate appropriate signals representative, respectively, of the two positions. After an appropriate time delay initiated by completion of the prior assembly cycle, the pick-up arm rotating means is activated to move the arm from the pick-up position to the operating position.

The combined ring clamping means and ring rotating means comprises a forward pair of upper and lower ring gripper fingers and a similar rear pair of upper and lower ring gripper fingers, each of which finger pairs has tip portions which are disposed in the operating position and are movable vertically relative to one another between an open position and a ring clamping position. In the clamping position, the split ring is clamped in a generally horizontal position between the tip portions of both pairs of ring gripper fingers. Means are provided for moving the tip portions of each of said pairs of fingers between the open and clamping positions and for counterrotating each pair of upper and lower fingers in the clamping position to rotate the split ring in the plane in which it is clamped. The pick-up arm operating position signal is operative to activate the means for moving the finger tip portions to the ring clamping position. In addition, a second sensor means is utilized to sense the open position and ring clamping position of the finger tip portions and to generate appropriate signals representative, respectively, of the open and ring clamping positions. The ring clamping position signal is operative to activate the pick-up arm rotating means to cause the arm to rotate from the operating position back to the pick-up position.

The two-stage ring splitter means comprises a splitter knife which includes interconnected first and second stage knives mounted on a first stage slide means for movement between a first inactive position and the operating position. The first stage slide means is, in turn, mounted on a second stage slide means for moving the second stage knife between a second inactive position and the operating position. Separate first and second stage moving means are provided for, respectively, moving said first and second stage slide means. Generation of the pick-up position signal is operative to activate the first stage moving means to move the first stage knife from the first inactive position to the operating position. Third sensor means are provided for sensing the first inactive position and the operating position of the first stage slide means and for generating appropriate signals representative, respectively, of these positions. The first stage operating position signal is operative to activate the means for counterrotating the ring gripper fingers comprising each pair.

Means are provided for mounting the splitter knife on the first stage slide means for vertical movement in response to rotation of the split ring and engagement of the first stage knife with the wire crossover at the gap in the split ring, such that the first stage knife moves to an upper position out of engagement with the split in the ring and the second stage knife moves into horizontal alignment with the split. Fourth sensor means are utilized to sense the upper position of the first stage knife and to generate an appropriate signal representative of the upper position. First timer means is responsive to the upper position signal for terminating rotation of the ring by the counterrotating means at a position in which the ring gap is directly adjacent the operator and for activating the second stage slide means to move the second stage knife into the operating position where it enters and opens the split in the ring.

Operation of the operator-actuated switch means is also effective to activate the first and second stage moving means to cause retraction of the first and second stage knives from their operative positions on the ring, and for activating the clamping finger counterrotating means to rotate the ring. A second timer means, also activated by said switch means, operates to deactivate the finger counterrotating means after the ring has been rotated to a position in which the object is fully attached, said second timer means being also operable to activate the means for moving the finger tip portions to cause each of said pairs of tip portions to move to the open position and release the ring.

Release of the ring automatically initiates a timing function which, after an appropriate delay, activates the means for rotating the ring pick-up arm to carry the next ring to the operating position only after generation of the clamping finger open position signal by the second sensor means and the splitter wheel first inactive position signal by the third sensor means.

BRIEF DESCRIPTION OF THE DRAWINGS

FIG. 5 is an enlarged detail, partly in section, showing the ring gripping jaws on pick-up arm in the pick-up position.

FIG. 6 is an enlarged detail, partly in section, showing a ring clamped between the tip portions of one pair of ring gripper fingers.

FIG. 7 is an enlarged detail, partly in section, showing the first stage splitter knife in engagement with the split in the split ring.

FIG. 8 is an enlarged detail, partly in section, showing the second stage splitter knife in engagement with and opening the split in the split ring.

FIG. 9 is an enlarged perspective view of a conventional split ring of the type operated upon by the apparatus of the present invention.

DETAILED DESCRIPTION OF THE PREFERRED EMBODIMENT

Figure 1:
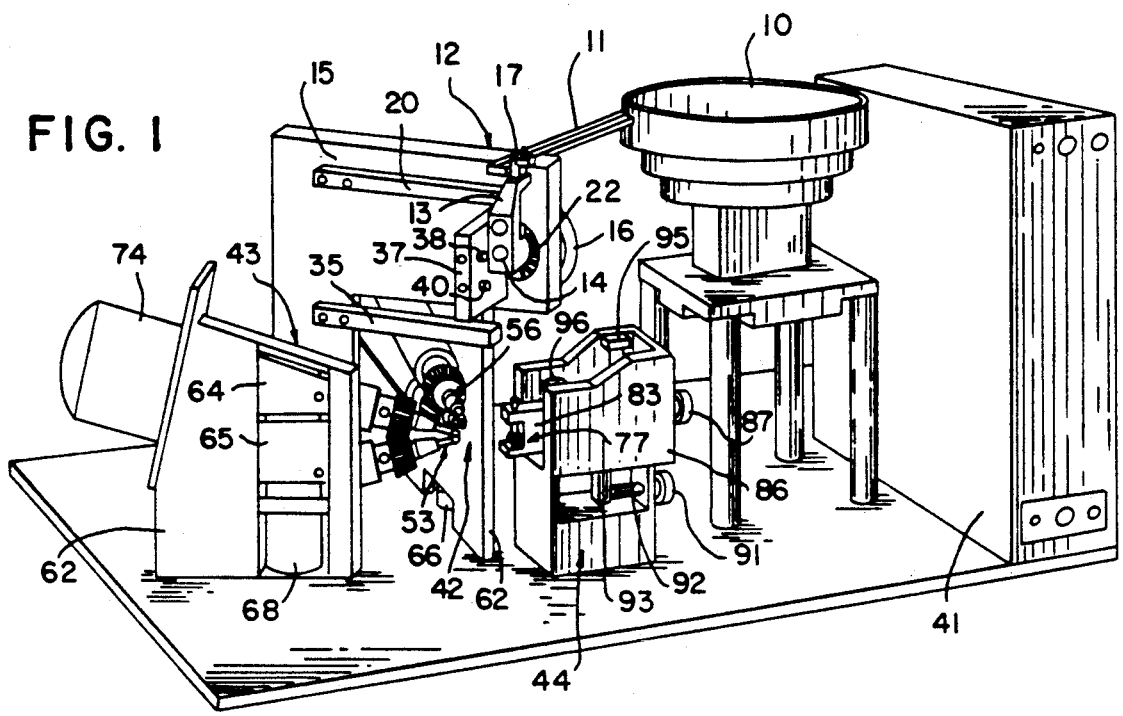
FIG. 1 is a front perspective view showing the orientation and general interrelationship between the various subassemblies comprising the split ring assembly apparatus of the present invention.

As shown in FIG. 1, the apparatus of the present invention for facilitating the assembly of objects on a split ring includes a ring delivery and pick-up subassembly having a vibratory feeder 10 of a generally known construction from which split rings are continuously fed to a feeder track 11 along which the split rings travel in a single row to a pick-up position 12 at the end of the feeder track remote from the vibratory feeder. A rotary pick-up arm 13 is rotatably mounted on a pivot shaft 14 to a pick-up arm supporting plate 15. The upper edge of the supporting plate 15 also supports the feeder track 11 adjacent the pick-up position 12.

Figure 2:
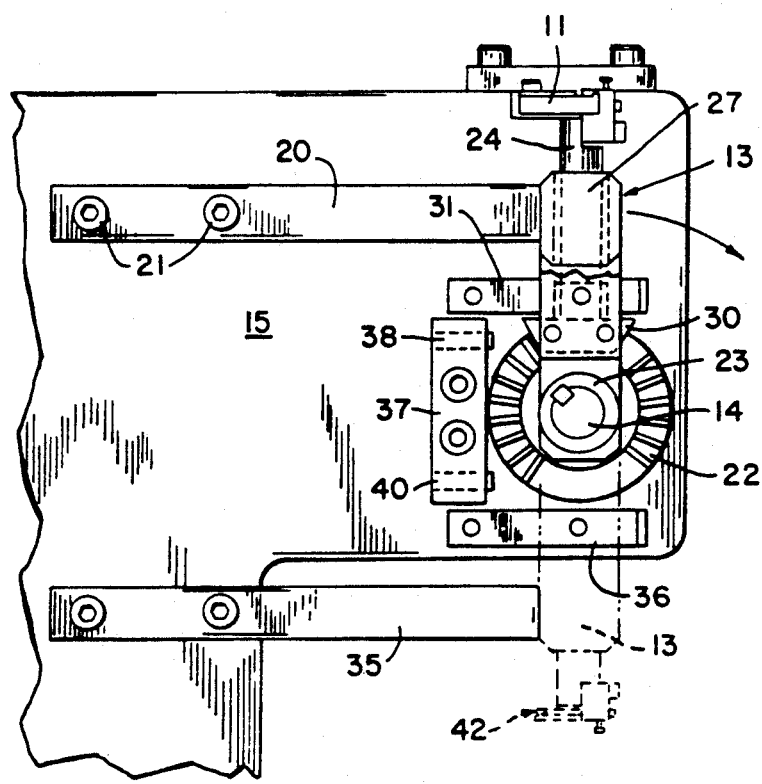
FIG. 2 is an enlarged side elevation of the pick-up arm subassembly of the apparatus of the present invention.
Figure 3:
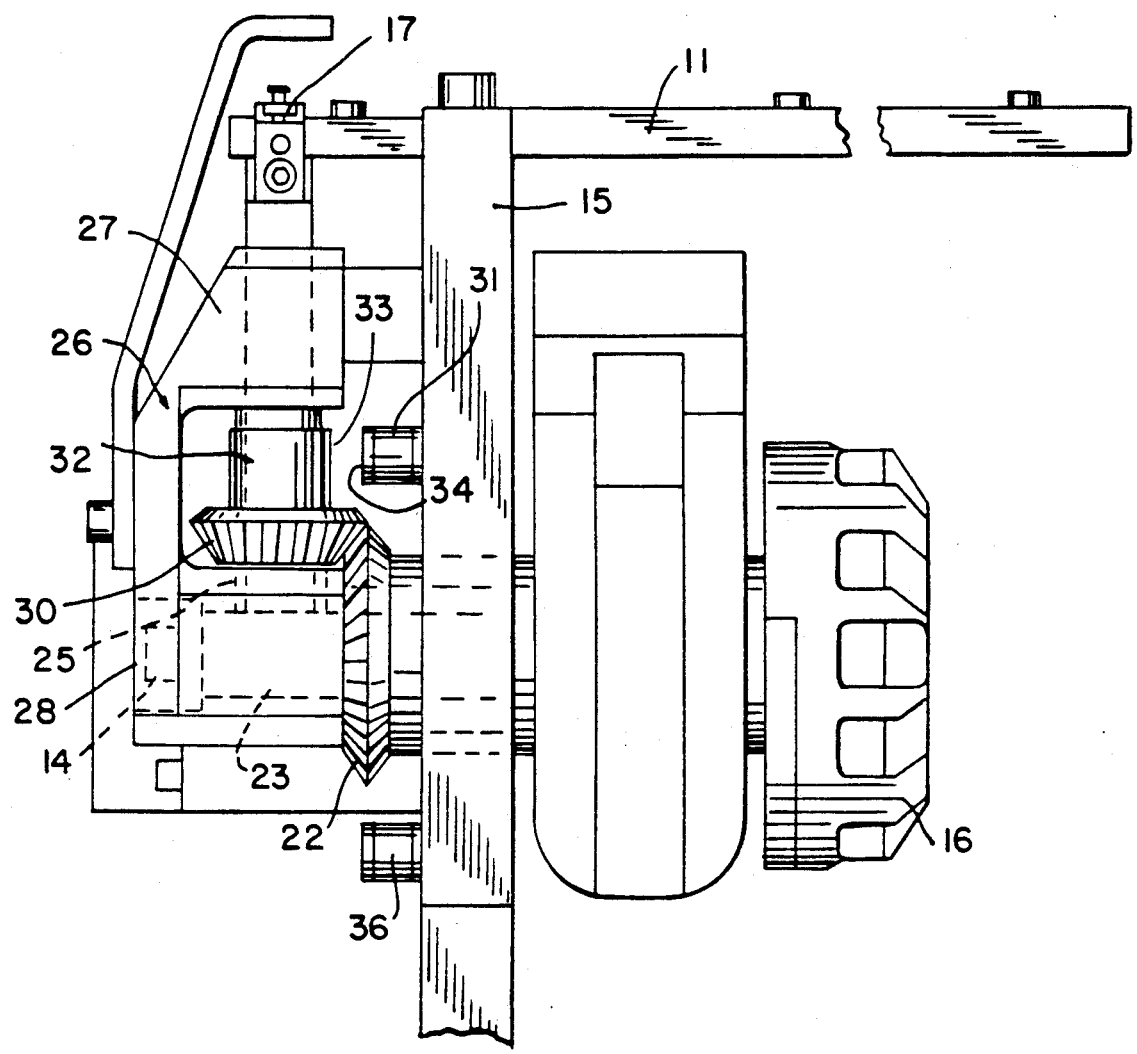
FIG. 3 is an enlarged front elevation of the pick-up arm subassembly.

The pick-up arm pivot shaft 14 extends through the supporting plate 15, is suitably journalled for rotation therein, and has its opposite end operatively attached to a rotary actuator 16 mounted on the supporting plate 15 on the side opposite a pick-up arm 13. The rotary actuator 16 is operable to rotate the pick-up arm about it pivot shaft 14 from the upper pickup position shown in FIGS. 1 and 2 through an arc of approximately 180° to a downwardly extending operating position, which will be described in greater detail hereinafter.

The free end of the pick-up arm 13 opposite the pivot shaft 14 includes a pair of spring biased jaws 17 for grasping a split ring 18, as shown in greater detail in FIG. 5. In response to rotation of the pick-up arm upwardly to the pick-up position 12, the jaws 17 engage a split ring 18 at the end of the feeder track 11 in the pick-up position, causing the jaws 17 to open against the bias of a spring such that the split ring is grasped therebetween. An upper stop block 20 is engaged by pick-up arm 13 as it reaches the end of its upward rotary movement to the pick-up position 12. The stop block 20 is mounted for horizontal sliding movement and may be selectively positioned with appropriate adjustment screws 21 to precisely locate the jaws 17 with respect to the split ring 18 which is being picked up.

Because it is desirable to deliver a split ring from the pick-up position 12 to the lower operating position in a manner in which the split ring is inserted in the direction of rotation of the pick-up arm into an appropriate clamping means (to be described), the pick-up arm jaws 17 and the split ring 18 grasped therein must also be rotated approximately 180° on the longitudinal axis of the pick-up arm 13 as the arm is translated rotationally between the upper pick-up position 12 and the lower operating position. To effect axial rotation of the pick-up arm 13 and jaws 17, a stationary bevel gear segment 22 is attached to the pick-up arm supporting plate 15 surrounding the axis of the pick-up arm pivot shaft 14. The pick-up arm 13 includes a hub 23 journalled for rotation on the pivot shaft 14. A jaw rotating shaft 24 is journalled for rotation on its axis to the hub 23 by a bearing 25. The ring grasping jaws 17 are attached to the radial outer end of the jaw rotating shaft 24 and the shaft is supported for rotation by a yoke 26 having an outer end 27 through which the jaw shaft 24 extends and an inner end 28 attached to the outer end of the pick-up arm pivot shaft 14. A bevel gear 30 is attached to the jaw rotating shaft 24 between the outer end 27 of the yoke 26 and the hub 23 of the pick-up arm. As the pick-up arm pivot shaft 14 is rotated by operation of the rotary actuator 16, bevel gear 30 will move into engagement with bevel gear segment 22 resulting in rotation of jaw rotating shaft 24 and attached jaws 17 on the axis of shaft 24. Thus, as the pick-up arm 17 is rotating through an arc of approximately 180° on its axis carrying therewith jaws 17 and the split ring 18 grasped therein.

An upper guide bar 31 is attached to the face of the pivot arm supporting plate 15 and positioned directly adjacent the shoulder 32 on the bevel gear 30 when the pick-up arm is in the upper pick-up position 12, as shown. The shoulder 32 is provided with an appropriate flat 33 which rotates with the bevel gear 30 into position closely spaced from a flat vertical surface 34 on the outside of the upper guide bar 31 to prevent further rotation of the jaws and jaw shaft 24 when the pick-up arm is in the pick-up position.

Also attached to the pick-up arm supporting plate 15 are a lower stop block 35 and a lower guide bar 36. These elements provide functions similar to the upper stop block 20 and upper guide bar 31, but with respect to the pick-up arm 13 in its lower operating position. A position sensor bracket 37 is also attached to the supporting plate 15 and is adapted to support an upper first sensor 38 and a lower first sensor 40 which are operative to detect and generate a signal representative, respectively, of the pick-up position and operating position of the pick-up arm 13. Position signals from the upper and lower first sensors 38 and 40 are transmitted to a microprocessor-based controller 41 to provide certain control functions as will be described.

When the pick-up arm 13 is rotated downwardly, the split ring 18 is carried in the jaws 17 to an operating position 42 where the ring may be clamped and rotated in a ring clamping/rotating subassembly 43 and opened by the cooperative operation of a splitter wheel subassembly 44. As previously indicated, a split ring 18 includes two adjacent upper and lower coils 45 and 46, respectively, formed from a single length of wire with the coils in tight face-to-face engagement to define therebetween a longitudinal split 47 running nearly the full circumference of the ring. The upper and lower free ends 48 and 50, respectively, of the ring define a gap 51 and are separated by the crossover portion 52 of the ring in the transition between the upper and lower coils 45 and 46.

Figure 4:
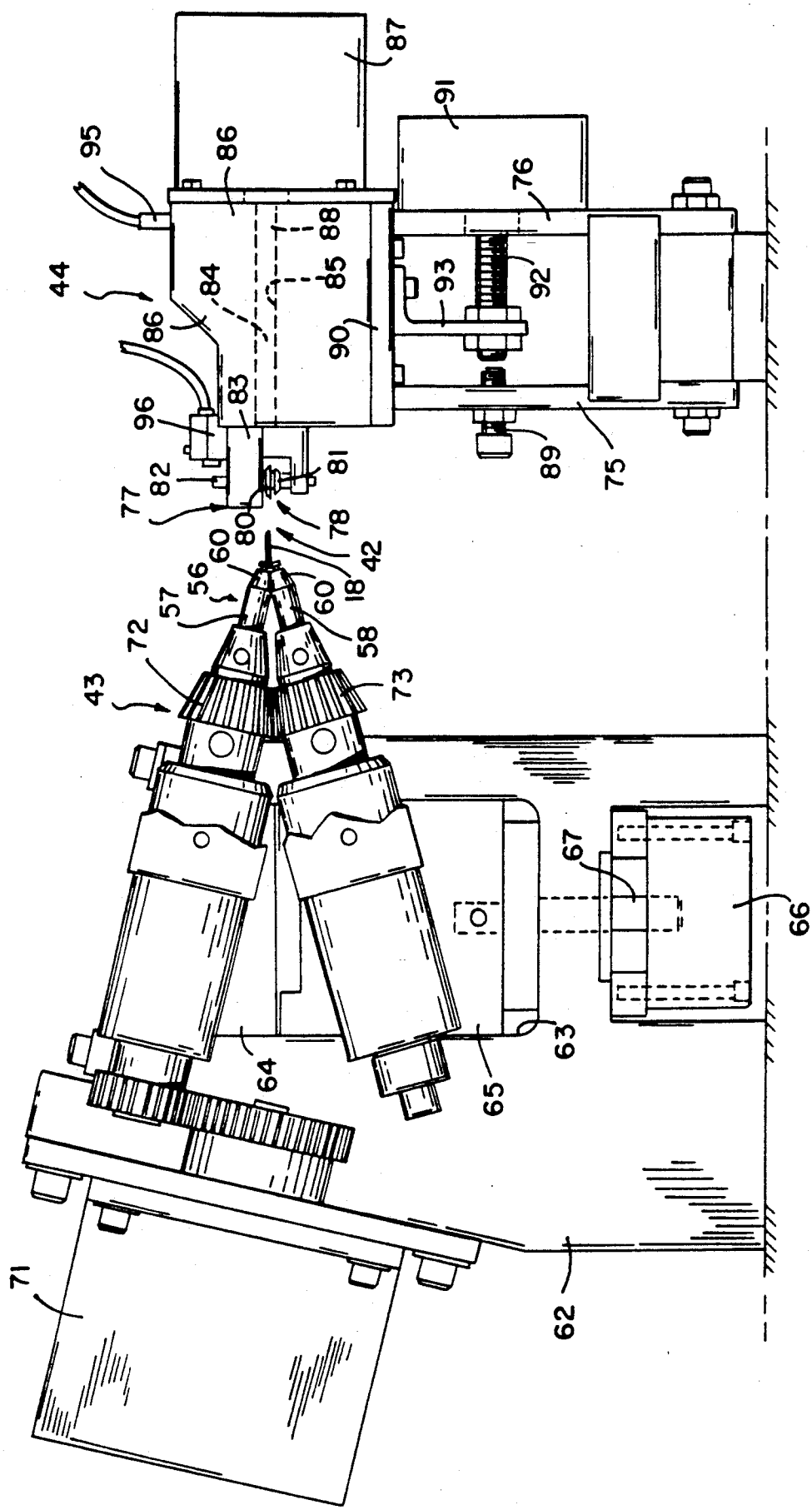
FIG. 4 is an enlarged side elevation of a portion of the ring clamping and rotating subassembly and the ring splitter subassembly showing the general interrelationship therebetween.

The ring clamping/rotating subassembly 43 includes a forward pair 53 of upper and lower gripper fingers 54 and 55, respectively, and a rear pair 56 of upper and lower gripper fingers 57 and 58, respectively. Referring to FIGS. 4 and 6, the gripper fingers of each forward pair 53 and rear pair 56 each includes a tapered tip portion 60 the end of which is provided with a circumferential groove 61 shaped to engage the outer surface of a coil 45 or 46 of the split ring 18. The lower gripper finger 55 and 58 of the respective forward pair 53 and rear pair 56 is movable vertically with respect to the upper gripper finger 54 and 57 of each set pair such that the split ring 18 may be simultaneously clamped between both pairs of fingers.

Each pair 53 or 56 of gripper fingers is identical in construction and operation, except that one pair is mounted as the mirror image of the other. Referring to FIG. 4 wherein there is shown a side elevation of the rear pair 56 of upper and lower gripper fingers 57 and 58, a mounting bracket 62 includes a generally U-shaped mounting slot 63 within which are mounted an upper finger slide plate 64 and a lower finger slide plate 65 for vertical adjustable positioning. The upper gripper finger 57 is attached to the upper slide plate 64 and the lower gripper 58 is attached to the lower slide plate 65. Upper slide plate 64 is intended to be slid vertically in the mounting slot 63 to establish a set operating position and then locked in place with suitable set screws or the like (not shown). The lower slide plate 65 and attached lower gripper finger 58, on the other hand, are adapted for vertical reciprocal sliding movement in the mounting slot 63 in response to extension and retraction of a clamping cylinder 66. The clamping cylinder is attached to mounting bracket 62 and the end of the cylinder rod 67 is attached to the lower edge of the lower slide plate 65. Extension of the cylinder rod 67 moves the slide plate 65 and attached gripper finger 58 vertically upward toward the upper gripper finger 57 to clamp the split ring 18 in the circumferential grooves 61 in the tip portions 60 of the fingers. Correspondingly, retraction of the cylinder rod 67 will open the fingers 57 and 58 and cause the split ring to be released.

As previously indicated, the assembly for mounting and controlling the forward pair 53 of gripper fingers 54 and 55 is virtually identical and, in this regard, vertical movement of lower forward gripper finger 55 is similarly controlled by the operation of forward clamping cylinder 68. The rear and forward clamping cylinders 66 and 68 are connected to operate in a simultaneous manner such that the split ring is simultaneously clamped by both gripper finger pairs 53 and 56 or simultaneously released from being clamped thereby. Cylinders 66 and 68 are preferably double acting pneumatic types which are extended, held and retracted by applied air pressure.

At the beginning of an assembly cycle with the ring pick-up arm 13 in the pick-up position 12, both clamping cylinders 66 and 68 are retracted so that the lower gripper fingers 55 and 58 are in the open position and spaced from their respective upper fingers 54 and 57. Retraction of the clamping cylinders to release a prior split ring assembly initiates a timing delay after which the pick-up arm is rotated downwardly to deliver the next split ring to the operating position 42. The final operating position of the pick-up arm is detected by the lower first sensor 40 and this operating position signal is operative to activate both clamping cylinders 66 and 68 to move their respective lower fingers 55 and 58 upwardly to clamp the split ring which has been delivered in the appropriate horizontal orientation by the jaws 17 of the pick-up arm. A second sensor 70 is attached to the mounting bracket 62 and positioned to sense the position of the lower finger slide plate 65 and to generate appropriate signals representative of the open position and clamping position of the rear finger pair 56. Because, as previously indicated, rear and forward clamping cylinders 66 and 68 are controlled to operate together, the signals generated by the second position sensor 70 are also representative of the open and clamping positions of the forward finger pair 53. The clamping position signal generated as the lower fingers move upwardly to engage and clamp the split ring is operative to activate the rotary actuator 16 and cause the pick-up arm to rotate upwardly back to the pick-up position 12. The force of the biasing spring controlling the clamping of the jaws 17 is substantially less than the clamping force exerted on the split ring by the forward and rear gripping finger pairs such that the split ring slips easily out of the jaws as the pick-up arm returns to the pick-up position.

Means are also provided to cause counterrotation of the tip portion 60 of each of the fingers comprising the forward and rear pairs 53 and 56, respectively. Counterrotation of the tips 60 with the split ring 18 clamped therebetween will result in circular rotation of the split ring in the generally horizontal plane in which it is clamped. To provide rotation of the rear pair 56 of gripper fingers, a rear drive motor 71 is attached to the rear mounting bracket 62 to provide driving rotation to upper rear gripper finger 57. An upper rear drive gear 72 is attached to the finger 57 for rotation therewith and is positioned to engage a similar lower rear drive gear 73 on the lower rear gripper finger 58, in the clamped position, to provide the requisite counterrotation of the finger tip portions 60 for rotating the split ring 18. The forward finger pair 53 is similarly rotated by operation of a forward drive motor 74 controlled simultaneously with the operation of rear drive motor 71.

Referring also to FIGS. 7 and 8, the splitter wheel subassembly 44 is adapted to operate in conjunction with the ring clamping/rotation subassembly 43 to locate and accurately position the gap 51 in the split ring and to open the split 47 adjacent the lower free end 50 of the coil 46. The splitter wheel subassembly 44 includes main forward and rear support brackets 75 and 76, respectively, on the upper end of which is mounted a ring splitter wheel mechanism 77. The splitter wheel mechanism includes a rotary splitter wheel 78 comprising integral first and second stage knives 80 and 81, respectively. The rotary splitter wheel 78 is mounted on a vertically oriented splitter wheel shaft 82 which is journalled at its upper and lower ends for rotation in a splitter wheel slide block 83. The splitter wheel shaft 82 and attached rotary splitter wheel 78 are also free to move vertically in the journalled connections. The slide block 83 includes a pair of integral horizontally disposed runners 84 on opposite sides which are adapted to slide in matching horizontal grooves 85 on the inside faces of a pair of oppositely disposed slide plates 86. A first stage slide cylinder 87 is attached to the rear edges of the slide plates 86 and has a cylinder rod 88 attached to the splitter wheel slide block 83, such that extension and retraction of the first stage cylinder 87 will cause the slide block and attached rotary splitter wheel 78 to slide horizontally along the slide plates 86. The slide plates 86 are attached, in turn, to a horizontal lower slide plate 90 which is supported for independent horizontal sliding movement in the upper ends of forward and rear support brackets 75 and 76. A second stage slide cylinder 91 is attached to the rear support bracket 76 and has a horizontally disposed cylinder rod 92 to the end of which is mounted an angle bracket 93 the upper end of which is, in turn, attached to the lower slide plate 90. Operation of the second stage slide cylinder 91 to extend and retract the cylinder rod 92 results in reciprocal sliding movement of the upper slide plates 86 as well as the entire splitter wheel mechanism 77 slidably attached thereto. An adjustable stop 89 may be used to precisely limit extension of second stage cylinder 91 and, thereby, precisely position second stage knife 81. Thus, the entire subassembly 44 includes separately operable slide mechanisms both of which cause horizontal reciprocal movement of the rotary splitter knife 78 including the integral first and second stage knives 80 and 81, respectively.

The first stage slide cylinder 87 operates to move the first stage knife 80 (as well as the integrally attached second stage knife 81) from a first inactive position into the operating position 42 where the sharp peripheral edge 94 of the first stage knife 80 engages the split 47 of the split ring 18 clamped in the clamping/rotating subassembly 43. Because the split ring 18 is randomly oriented with respect to the position of he ring gap 51, engagement of the first stage knife edge with the ring split may occur anywhere around the circumference of the ring. The pick-up position signal, generated when the pick-up arm has returned to the upper pick-up position, is operative to activate the first stage slide cylinder 87 to extend the cylinder rod 88 and move the splitter wheel slide block to move the first stage knife 80 into engagement with the split 47 in the split ring as just described.

A third position sensor 95 is attached to the upper edge of the rearmost slide plate 86 in a position to detect the first inactive position and operating position of the splitter wheel 78 and to generate appropriate signals representative of those positions. The first stage operating position signal from the third sensor 95, indicative of engagement of the ring split by the first stage knife edge 94, is operative to activate both gripper finger drive motors 71 and 74 to cause rotation of the split ring 18 and the rotary knife edge 94 to track along the split. When the split ring has been rotated to the point where the first stage knife edge 94 engages the crossover portion 52, the splitter wheel shaft 82 will move vertically upwardly, as the knife edge is deflected upwardly by the inclined crossover portion, until the edge 94 of the first stage knife 80 rides out of the split and is positioned in engagement with the top surface of the upper coil 45 of the split ring. A fourth position sensor 96 is mounted at the top of the splitter wheel slide block 83 in a position to detect movement of the upper end of the splitter wheel shaft 82 to its highest position in response to deflection of the splitter wheel upwardly as the first stage edge 94 rides over the crossover portion onto the top of the ring. At this point, the peripheral edge 97 of the second stage knife 81, which is of slightly smaller diameter and spaced vertically below the first stage knife 80, is in horizontal alignment with the split 47 in the split ring 18, but spaced slightly therefrom. Generation of the signal representative of the upper position of the first stage knife 80 (which signal is also representative of location of the split ring gap 51) is operative to activate a first timer in the microprocessor 41 to terminate rotation of the split ring after a short period of continuing rotation to a position where the gap is in the forward region of the operating position 42 and directly adjacent an operator position in front of the apparatus. The signal from fourth position sensor 96 also activates the second stage slide cylinder 91 to move the peripheral edge 97 of the second stage knife 81 horizontally into the split 47 in the split ring, causing separation of the upper and lower coils 45 and 46 and movement of the lower free end 50 away from the gap 51. At this point, the entire mechanism is at rest and the split ring is open with direct operator access to the lower free end 48 of the ring coil such that any closed-loop object desired to be attached to the split ring may be placed over the free end by the operator.

Both first and second stage slide cylinders 87 and 91 are preferably pneumatically operated double acting cylinders. With the object to be attached to the split ring positioned on the open free end 50, the operator-actuated switch, such as a foot switch, is activated to cause the first and second stage cylinder rods 88 and 92 to retract under pressure, thereby moving the rotary splitter knife 78 completely out of the operating position 42. Activation of the operator-actuated switch simultaneously causes activation of the clamping finger drive motors 71 and 74 to recommence rotation of the split ring. The object or objects to be attached to the ring are held by the operator while the split ring is rotated with respect to said objects until the ring has rotated approximately one full revolution and the objects pass the upper free end 48, whereupon they are fully attached to the ring. Rotation of the ring is controlled by a second timer circuit in the microprocessor 41 which, when timed out, deactivates the ring drive motors 71 and 74 and causes the ring clamping cylinders 76 and 78 to retract, resulting in release of the split ring and attached object or objects.

Referring particularly to FIGS. 4 and 8, the opening in the split ring provided by entry of the second stage knife 81 is preferably wide enough to accommodate whatever object is intended to be attached to the ring. When the object, such as the closed end of a hook and/or the eyelet on the end of a lure body, is slipped over the free end 50 of the lower coil 46 and the splitter wheel 78 retracted, the split in the ring is thereafter held open by the wedging action of the object or objects attached, at least until subsequent operator-activated rotation of the ring is completed. However, after the operator activates the switch to withdraw the rotary splitter knife 78 and activate the gripper finger drive motors 71 and 74, rotation of the split ring 18 will quickly bring the free end 50 of the lower coil 46 into contact with the tip portions 60 of the forward pair 53 of upper and lower gripper fingers 54 and 55. Both the forward pair 53 and rear pair 56 of gripper fingers must clamp the split ring tightly enough to rotate the same without any significant slippage, yet must be able to accommodate the vertical displacement created by the open split as a result of the partially attached objects. This is particularly true of the forward gripper finger pair 53 and to a lesser extent the rear finger pair 56 because, with respect to the latter, the split ring tends to remain closed during passage between the rear gripper fingers 57 and 58 because of their remote diametrically opposite position from the point of attachment of the objects. Both the forward clamping cylinder 68 and the rear clamping cylinder 66 are pneumatically operated and, although stroked simultaneously to cause the gripper fingers to close and clamp the split ring, the forward cylinder 68 is operated at a lower air pressure. In this manner, the forward gripper fingers 54 and 55 may be more readily forced apart as the gap of the ring wedged open by the object being attached moves into engagement with the tip portions of those fingers. However, by the time the ring passes the forward finger pair 53 and approaches the rear pair 56, the split has substantially closed and, as a result, the rear clamping cylinder 66 may be operated at a higher air pressure to assure adequate clamping force and minimize the chance of ring slippage.

After completion of the assembly cycle as a result of the timeout of the second timer circuit, the pick-up arm 13 which has previously returned to the pick-up position where it has grasped and holds another split ring, is automatically activated to rotate downwardly and deliver the next split ring to the gripper fingers in the operating position. However, to make sure that the apparatus is completely cleared, the microprocessor 41 is programmed to disable rotation of the pick-up arm until generation of the open position signal by the second position sensor 70 (indicating retraction of both clamping cylinders 66 and 68) and generation of the first inactive position signal by the third position sensor 95 (indicating retraction of the first stage slide cylinder 87 and movement of the rotary splitter knife 78 out of the operation position).

The use of the microprocessor control along with the various position sensors substantially enhances the reliability of the operating cycle as well as safety of operation. In addition, however, microprocessor control adds a significant element of flexibility enabling the assembly apparatus of the present invention to accommodate a significant range of split ring sizes. To accommodate varying ring sizes, the first and second timers, controlling initial rotation of the ring to position the gap and secondary rotation of the ring to complete the assembly, may be readily reprogrammed to accommodate changing ring circumferences. The necessary mechanical adjustments to the ring clamping/rotation subassembly 43 and splitter wheel subassembly 44 to accommodate variations in ring sizes may also be readily accomplished.

Various modes of carrying out the present invention are contemplated as being within the scope of the following claims particularly pointing out and distinctly claiming the subject matter which is regarded as the invention.

I claim:

1. A split ring assembly apparatus for facilitating operator attachment of a closed-loop object to a split ring, said apparatus comprising:
   means for sequentially feeding a plurality of split rings to a pick-up position;
   transfer means for grasping a split ring from the pick-up position and transferring the ring to an operating position;
   ring clamping means located at the operating position for receiving and clamping the ring transferred by the transfer means;
   splitter means movable into the operating position and having a first stage for engaging and entering without opening the split in the ring;

ring rotating means integral with said clamping means for rotating the ring and operable to cause the first stage of said splitter means to track along the split for locating and selectively positioning the gap in the ring;

said splitter means having a separate second stage movable into said operating position for engaging and opening the split adjacent a free end of the ring to allow operator placement of the object over said free end of the open ring; and, said rotating means being operable for rotating the open ring along and with respect to said object and causing said object to be fully attached to the ring.

2. The apparatus as set forth in claim 1 wherein said transfer means comprises:
   a pick-up arm mounted for rotation about one end to move the other end between the pick-up position and the operating position;
   spring biased jaw means on said other end of the pick-up arm for grasping the split ring;
   said pick-up arm and jaw means being rotatable on the axis of said arm in response to rotation thereof about said one end; and,
   means for rotating said pick-up arm about said one end and on the axis of said arm.

3. The apparatus as set forth in claim 2 wherein said feeding means comprises a vibratory feeder adapted to deliver split rings oriented generally horizontally in the plane thereof and randomly with respect to the circumferential position of the split ring gap.

4. The apparatus as set forth in claim 1 wherein said ring clamping means and said ring rotating means comprises in combination:
   a forward pair of upper and lower gripper fingers;
   a rear pair of upper and lower gripper fingers;
   each of said pairs of fingers having tip portions disposed in said operating position and movable vertically relative to one another between an open position and a ring clamping position wherein the split ring is clamped generally horizontally between said tip portion by both pairs of upper and lower gripper fingers;
   means for moving the tip portions of each of said pairs of upper and lower fingers between said open and said ring clamping positions; and,
   means for counterrotating each pair of upper and lower fingers in the clamping position to rotate the split ring in the plane in which the ring is clamped.

5. The apparatus as set forth in claim 4 including first sensor means for sensing the pick-up position and the operating position of said pick-up arm and for generating signals representative respectively of said pick-up and operating positions.

6. The apparatus as set forth in claim 5 wherein said pick-up arm operating position signal is operative to activate said tip portion moving means to cause each of said pairs of tip portions to move from said open position to said ring clamping position, and further including second sensor means for sensing the open position and the ring clamping position of said finger tip portions and for generating signals representative respectively of said open and ring clamping positions, time delay means responsive to said open position signal to cause said pick-up arm to rotate from said pick-up position to said operating position, and wherein said ring clamping position signal is operative to activate said pick-up arm rotating means to cause said pick-up arm to rotate from said operating position to said pick-up position.

7. The apparatus as set forth in claim 6 wherein said splitter means comprises:
   a splitter knife including interconnected first and second stage knives mounted on a first stage slide means for moving said first stage knife between a first inactive position and said operating position;
   said first stage slide means mounted on a second stage slide means for moving said second stage knife between a second inactive position and said operating position;
   first stage moving means for moving said first stage slide means;
   second stage moving means for moving said second stage slide means;
   wherein said pick-up position signal is operative to activate said first stage moving means to move said first stage knife from said first inactive position to said operating position;
   third sensor means for sensing said first inactive position and said operating position of said first stage slide means and for generating signals representative respectively of said positions;
   wherein said first stage operating position signal is operative to active said gripper finger counterrotating means;
   means for mounting said splitter knife on said first stage slide means for vertical movement in response to rotation of the split ring and engagement of said first stage knife with the wire crossover at the gap in said ring, whereby said first stage knife moves to an upper position out of engagement with the split in said ring and said second stage knife moves into horizontal alignment with said split;
   fourth sensor means for sensing the upper position of said first stage knife and for generating a signal representative of said upper position;
   said upper position signal operative to activate said second stage slide means to move said second stage knife to said operating position within the split in the ring; and,
   first timer means responsive to said upper position signal for terminating rotation of the ring by said counterrotating means to position the ring gap adjacent the operator.

8. The apparatus as set forth in claim 7 wherein said operator-actuated switch means is further operable to activate said first and second stage moving means to, respectively, move said first stage knife to said first inactive position and move said second stage knife to said second inactive position, and for activating said counterrotating means; and,
   further including second timer means operable in response to actuation of said switch means for deactivating said counterrotating means after rotation of the ring to a position in which the object is fully attached thereto and for activating said tip portion moving means to cause each of said pairs of tip portions to move to said open position.

9. The apparatus as set forth in claim 7 wherein said pick-up arm rotating means is operable to move said pick-up arm to said operating position after generation of said open position signal by said second sensor means and said first inactive position signal by said third sensor means.

10. The apparatus as set forth in claim 1 wherein said splitter means comprises:
    a splitter wheel mounted on a vertically disposed shaft;

said splitter wheel including a first stage knife having a circular peripheral edge and a second stage knife having a circular peripheral edge of smaller diameter than said first stage knife edge;

a first slide member supporting said splitter wheel shaft for rotation and vertical axial movement;

first means supporting said first slide member for reciprocal movement into and out of said operating position and for moving said first stage knife edge into engagement with the split; and, second means supporting said first means for reciprocal movement and for moving said second stage knife edge into said split engaging and opening position.

11. The apparatus as set forth in claim 10 wherein said ring rotating means is operative to rotate the split ring against said first stage knife edge with said first edge in continuous engagement with the split and to cause vertical axial movement of said shaft and splitter wheel by engagement of said first edge with the wire crossover at the gap in said ring, whereby said first stage knife moves to a position displaced from the split and said second stage knife moves into alignment with the split.

12. The apparatus as set forth in claim 11 including:

means for sensing the displaced position of said first stage knife and for generating a signal representative thereof; and, means responsive to said displaced position signal for terminating operation of said ring rotating means after rotation of said ring a selected distance beyond said displaced position and for activating said second means for moving said second stage knife edge.

* * * * *